(12) United States Patent
Shintaku et al.

(10) Patent No.: US 11,892,375 B2
(45) Date of Patent: Feb. 6, 2024

(54) INSPECTION METHOD AND INSPECTION DEVICE

(71) Applicant: NIPPON TELEGRAPH AND TELEPHONE CORPORATION, Tokyo (JP)

(72) Inventors: Masashi Shintaku, Tokyo (JP); Yoshihiro Iriyama, Tokyo (JP); Keisuke Kakimoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 34 days.

(21) Appl. No.: 17/616,249

(22) PCT Filed: Jun. 6, 2019

(86) PCT No.: PCT/JP2019/022596
§ 371 (c)(1),
(2) Date: Dec. 3, 2021

(87) PCT Pub. No.: WO2020/245992
PCT Pub. Date: Dec. 10, 2020

(65) Prior Publication Data
US 2022/0244130 A1    Aug. 4, 2022

(51) Int. Cl.
*G01M 3/28* (2006.01)
(52) U.S. Cl.
CPC .................. *G01M 3/2815* (2013.01)
(58) Field of Classification Search
CPC ............ G01M 3/00; G01M 3/26; G01M 3/28; G01M 3/2815
See application file for complete search history.

(56) References Cited

U.S. PATENT DOCUMENTS

| | | | | |
|---|---|---|---|---|
| 2,633,739 A * | 4/1953 | Potts | ................... | G01M 3/2846 |
| | | | | 73/49.5 |
| 3,827,282 A * | 8/1974 | Brister | .................... | G01M 3/00 |
| | | | | 73/40.5 R |

(Continued)

FOREIGN PATENT DOCUMENTS

| | | | | |
|---|---|---|---|---|
| EP | 3760997 A1 * | 1/2021 | .......... | G01M 3/2815 |
| JP | H0614941 A | 2/1994 | | |

(Continued)

OTHER PUBLICATIONS

Yamaguchi et al. (2006) "Inspection and diagnosis of pipeline equipment and repair and regeneration technology" NTT Technology Journal, vol. 18, No. 3, pp. 47-50 [online] website: http://www.ntt.co.jp/journal/0603/files/jn200603047.pdf.

*Primary Examiner* — Nguyen Q. Ha (57) ABSTRACT

An inspection method of the present invention includes supplying water from a tank to an interior of a conduit through a hose provided at one end of the conduit, releasing air from the interior of the conduit to an outside of the conduit through an air vent tube provided at another end of the conduit, determining whether or not water that does not contain air is drained from the air vent tube, when it is determined in the determining that water that does not contain air is drained from the air vent tube, stopping supplying water to the interior of the conduit, closing a valve of an air vent portion, and blocking both ends of the conduit, and performing pressurization by increasing a pressure of the interior of the conduit whose both ends are blocked and whose interior is filled with water, and measuring a pressure value of the interior of the conduit when the pressurization ends and a pressure value of the interior of the conduit when a predetermined period of time elapses.

16 Claims, 10 Drawing Sheets

(56) References Cited

U.S. PATENT DOCUMENTS

| | | | | |
|---|---|---|---|---|
| 4,430,887 A | * | 2/1984 | Roberts | G01N 3/12 |
| | | | | 141/285 |
| 4,599,890 A | * | 7/1986 | Girone | G01M 3/26 |
| | | | | 73/49.5 |
| 5,092,162 A | * | 3/1992 | Self | G01M 3/02 |
| | | | | 73/49.5 |
| 2006/0196251 A1 | * | 9/2006 | Richey | G01M 3/2815 |
| | | | | 73/49.1 |

FOREIGN PATENT DOCUMENTS

| JP | 2007278730 A | 10/2007 |
|---|---|---|
| JP | 2009192242 A | 8/2009 |

\* cited by examiner

INSPECTION METHOD AND INSPECTION DEVICE

CROSS-REFERENCE TO RELATED APPLICATIONS

This application is a U.S. National Stage Application filed under 35 U.S.C. § 371 claiming priority to International Patent Application No. PCT/JP2019/022596, filed on 6 Jun. 2019, the disclosure of which is hereby incorporated herein by reference in its entirety.

TECHNICAL FIELD

The present invention relates to an inspection method and an inspection apparatus for a conduit.

BACKGROUND ART

A maintenance and management technology for inspecting and diagnosing conditions of aging degradation in conduit facilities for telecommunication and repairing and renovating the aged facilities in a timely manner is an essential technology for improving the responsiveness of optical services and prolonging the lives of the facilities for a long term (for example, see Non Patent Literature (NPTL) 1).

Figure 6:
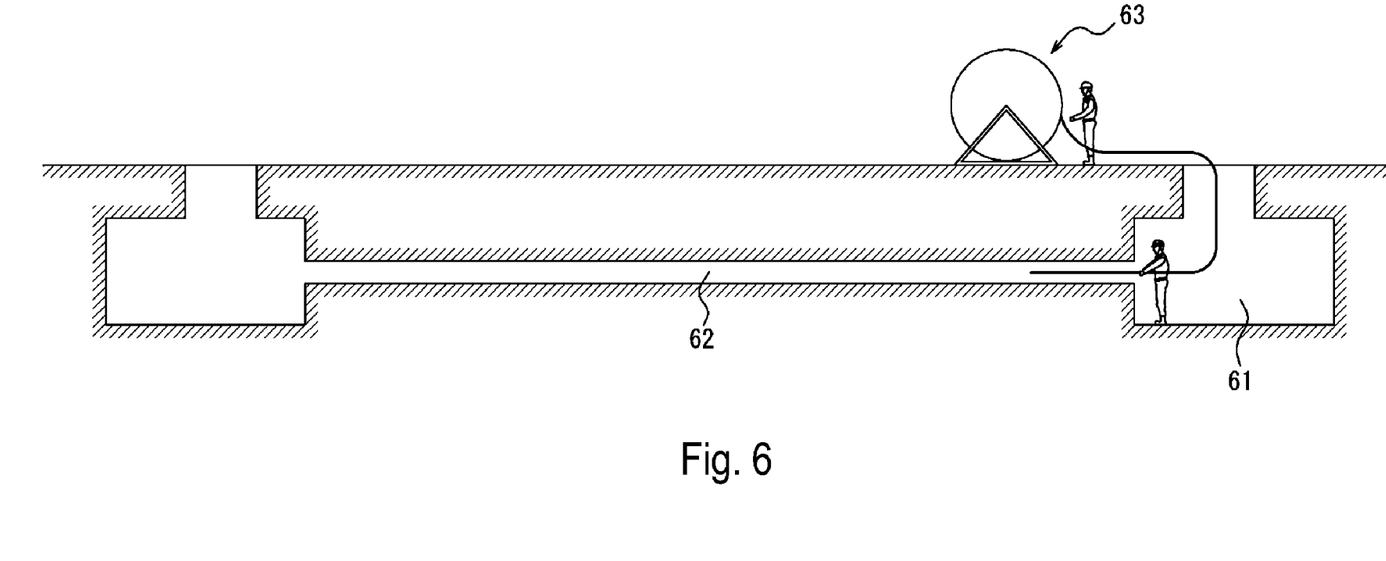
FIG. 6 is a diagram illustrating one example of a configuration of a known inspection apparatus in the art.

FIG. 6 is a diagram illustrating one example of a configuration of a known inspection apparatus in the art. In the art, an operator inserts a pipe camera 63 from a manhole 61 into an interior of a conduit 62 and visually checks a captured video to inspect a conduit accommodating a communication cable.

CITATION LIST

Non Patent Literature

NPTL 1: Yamaguchi et al., "Inspection/diagnosis and Repair/renovation Technologies for Conduits", NTT technology journal, March, 2006.3, P47-50, [online], [Search on May 29, 2019], internet URL:http://www.ntt.co.jp/journal/0603/files/jn200603047.pdf

SUMMARY OF THE INVENTION

Technical Problem

However, the known inspection method in the art has a problem that it is difficult for operators to find an abnormality of a conduit that cannot be visually checked from a captured video, such as a damaged portion (for example, a perforated portion) of the conduit that is small, or that is hidden under a cable. There has also been a problem that no quantitative indicator for determining the abnormality of the conduit exists, and thus, the operators make inspections with different accuracy. Furthermore, in the first place, there has also been a problem that the operator cannot insert a pipe camera in the conduit accommodating a thick cable or the like.

An object of the present invention that has been contrived in consideration of the above circumstances is to provide an inspection apparatus and an inspection method that are capable of inspecting a conduit with high accuracy without requiring a large space inside the conduit.

Means for Solving the Problem

In order to solve the problems described above, an inspection method according to the present invention includes supplying water from a tank to an interior of a conduit through a hose provided at one end of the conduit, releasing air from the interior of the conduit to an outside of the conduit through an air vent tube provided at another end of the conduit, determining whether or not water that does not contain air is drained from the air vent tube, when it is determined in the determining that water that does not contain air is drained from the air vent tube, stopping supplying water to the interior of the conduit, closing a valve of an air vent portion, and blocking both ends of the conduit, and performing pressurization by increasing a pressure of the interior of the conduit whose both ends are blocked and whose interior is filled with water, and measuring a pressure value of the interior of the conduit when the pressurization ends and a pressure value of the interior of the conduit when a predetermined period of time elapses.

In order to solve the problems described above, an inspection apparatus according to the present invention includes a water supply portion configured to supply water from a tank to an interior of a conduit through a hose provided at one end of the conduit, an air vent portion configured to release air from the interior of the conduit to an outside of the conduit through an air vent tube provided at another end of the conduit, a pressurizing portion configured to increase a pressure of the interior of the conduit whose both ends are blocked and whose interior is filled with water, and a pressure measurement portion configured to measure a pressure value of the interior of the conduit when pressurization ends and a pressure value of the interior of the conduit when a predetermined period of time elapses, wherein the water supply portion supplies water to the interior of the conduit until water that does not contain air is drained from the air vent tube.

Effects of the Invention

According to the present invention, it is possible to inspect the conduit with high accuracy without requiring a large space inside the conduit.

DESCRIPTION OF EMBODIMENTS

Hereinafter, an embodiment of the present invention will be described in detail with reference to the drawings.

Inspection Apparatus

Figure 1:
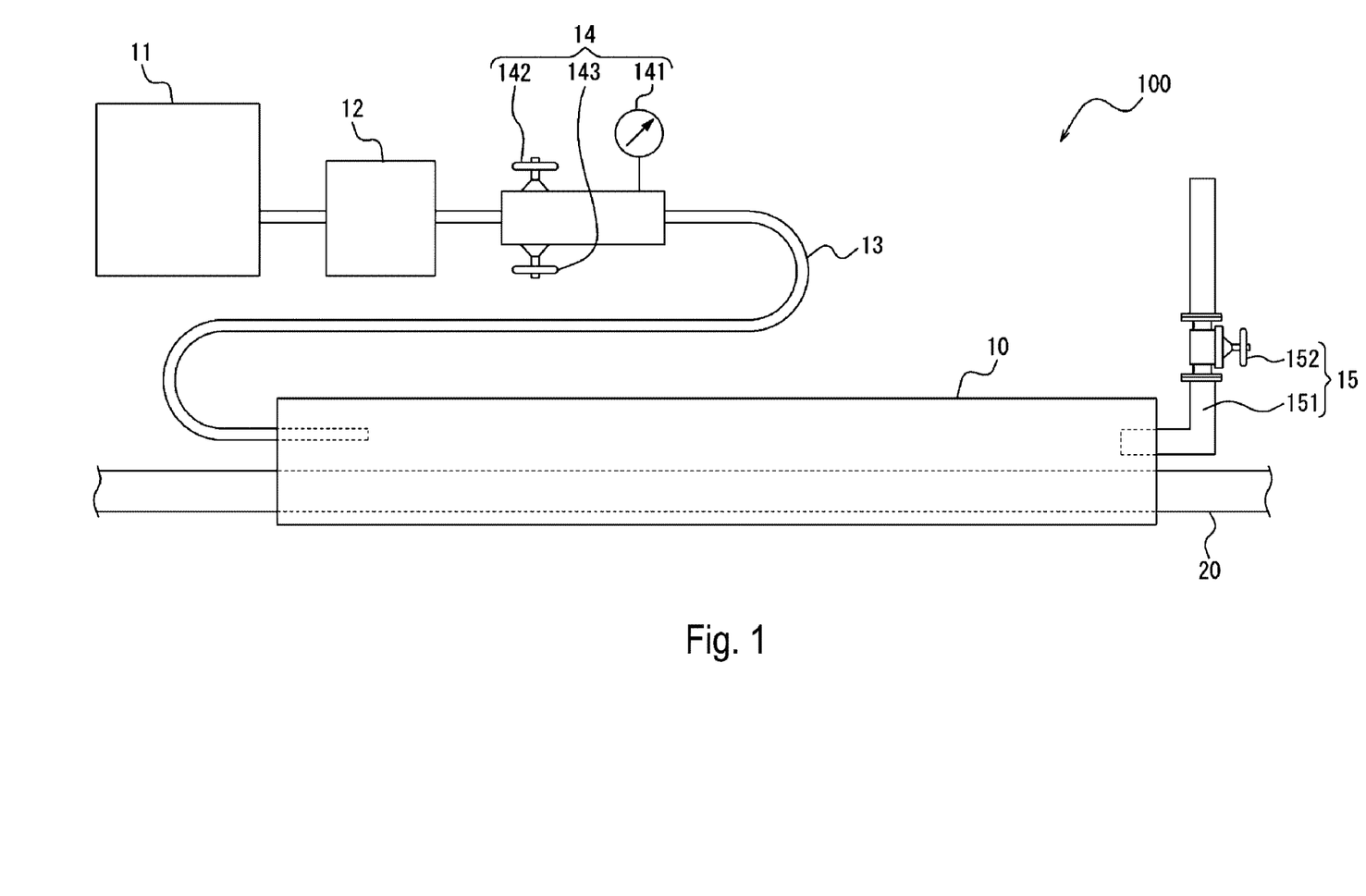
FIG. 1 is a diagram illustrating one example of a configuration of an inspection apparatus according to an embodiment of the present invention.

An inspection apparatus 100 according to an embodiment of the present invention will be described with reference to FIGS. 1 and 2.

The inspection apparatus 100 is an apparatus for inspecting a conduit 10 accommodating a cable 20. As illustrated in FIG. 1, the inspection apparatus 100 includes a tank 11, a pump 12, a hose 13, a pressure measurement apparatus 14, and an air vent portion 15. The pressure measurement apparatus 14 includes a pressure gauge (pressure measurement portion) 141, a water supply valve 142, and a drain valve 143 (see FIG. 2A). The air vent portion 15 includes an air vent tube 151 and a valve 152 (see FIG. 2B). A water supply portion is configured of, for example, the tank 11, the pump 12, the hose 13, the water supply valve 142, and the like (see FIGS. 2C and 2D). A pressurizing portion is configured of, for example, the tank 11, the pump 12, the hose 13, the pressure gauge 141, the water supply valve 142, the air vent portion 15, and the like.

The tank 11 stores water supplied from a water source or the like provided outside, and supplies the stored water to the interior of the conduit 10. The tank 11 stores at least a volume of water with which the interior of the conduit 10 can be filled. The tank 11 is connected to the pump 12 through the hose 13.

The pump 12 is connected to the tank 11 and the conduit 10 through the hose 13. The pump 12 is provided between the tank 11 and the conduit 10, and is configured so as to allow water to be supplied from the tank 11 to the interior of the conduit 10 through the hose 13. When the water supply valve 142 opens, the pump 12 starts supplying water from the tank 11 to the interior of the conduit 10, and when the water supply valve 142 closes, the pump 12 stops supplying water from the tank 11 to the interior of the conduit 10. The pump 12 may be manually operated by an operator or may be automatically operated by a controller or the like.

The hose 13 is provided at one end of the conduit 10 on the upstream side, and blocks the one end of the conduit 10. The hose 13 is connected to the tank 11, the pump 12, and the pressure measurement apparatus 14, connects the tank 11 and the pump 12 to each other, connects the pump 12 and the pressure measurement apparatus 14 to each other, and connects the pressure measurement apparatus 14 and the conduit 10 to each other. A flexible hose is used as the hose 13, for example.

A water supply portion is configured of, for example, the tank 11, the pump 12, the hose 13, and the water supply valve 142. The water supply portion opens the water supply valve 142 and drives the pump 12 to supply water from the tank 11 to the interior of the conduit 10 through the hose 13. When the water supply portion continues to supply water to the interior of the conduit 10, water is gradually accumulated in the interior the conduit 10. The water supply portion continues to supply water to the interior of the conduit 10 until water that does not contain air is drained from the air vent tube 151. When water that does not contain air is drained from the air vent tube 151, the interior of the conduit 10 is filled with water supplied by the water supply portion.

Figure 2A:
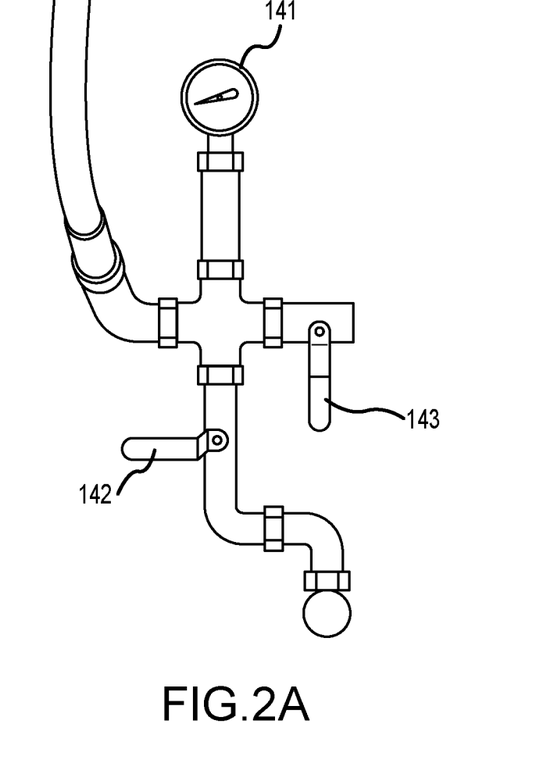
FIG. 2A is a view illustrating one example of a part of the configuration of the inspection apparatus according to the embodiment of the present invention.
Figure 2B:
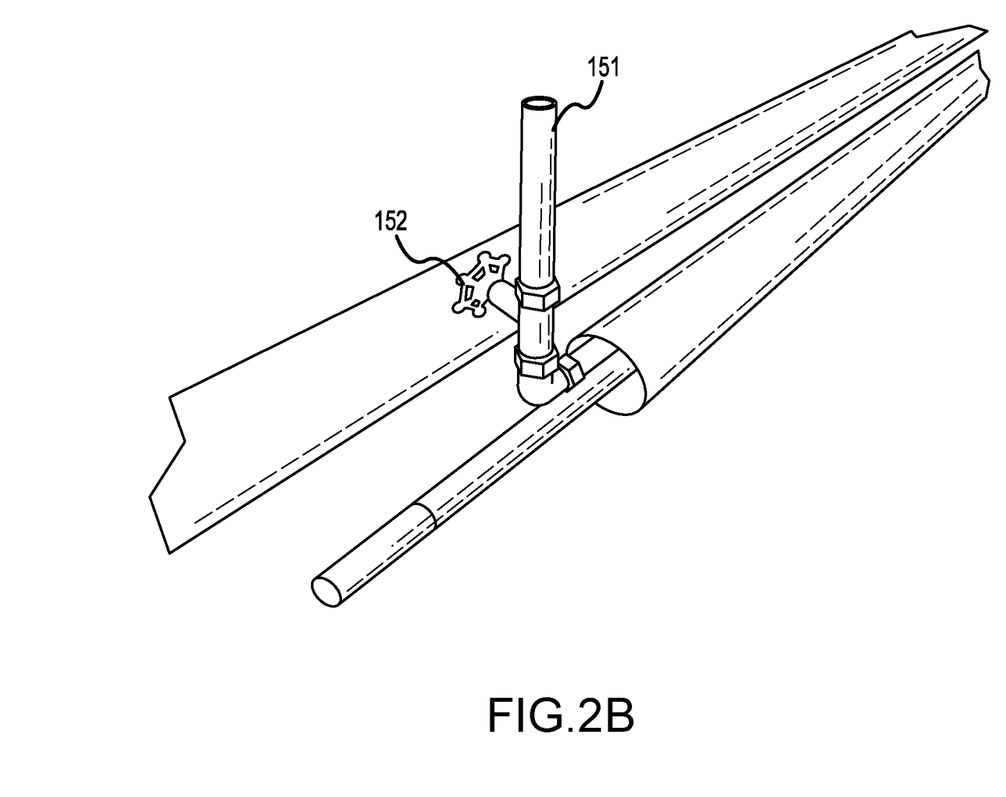
FIG. 2B is a view illustrating one example of a part of the configuration of the inspection apparatus according to the embodiment of the present invention.
Figure 2C:
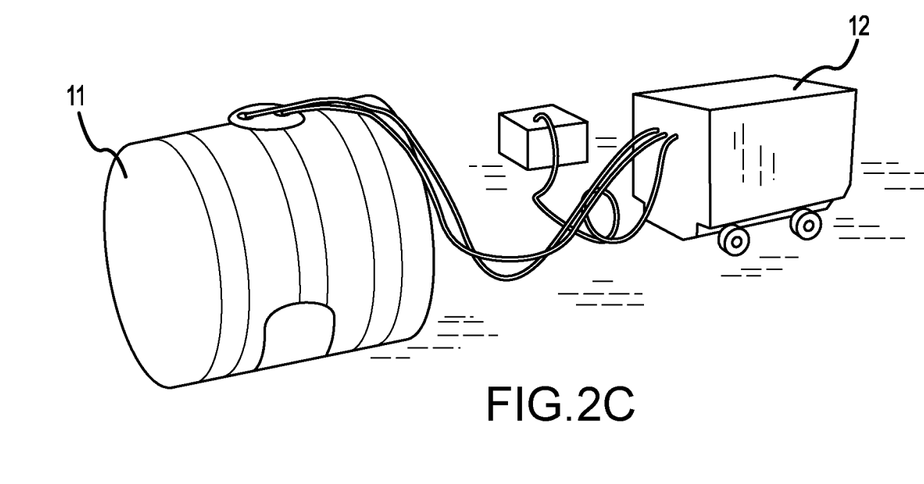
FIG. 2C is a view illustrating one example of a part of the configuration of the inspection apparatus according to the embodiment of the present invention.
Figure 2D:
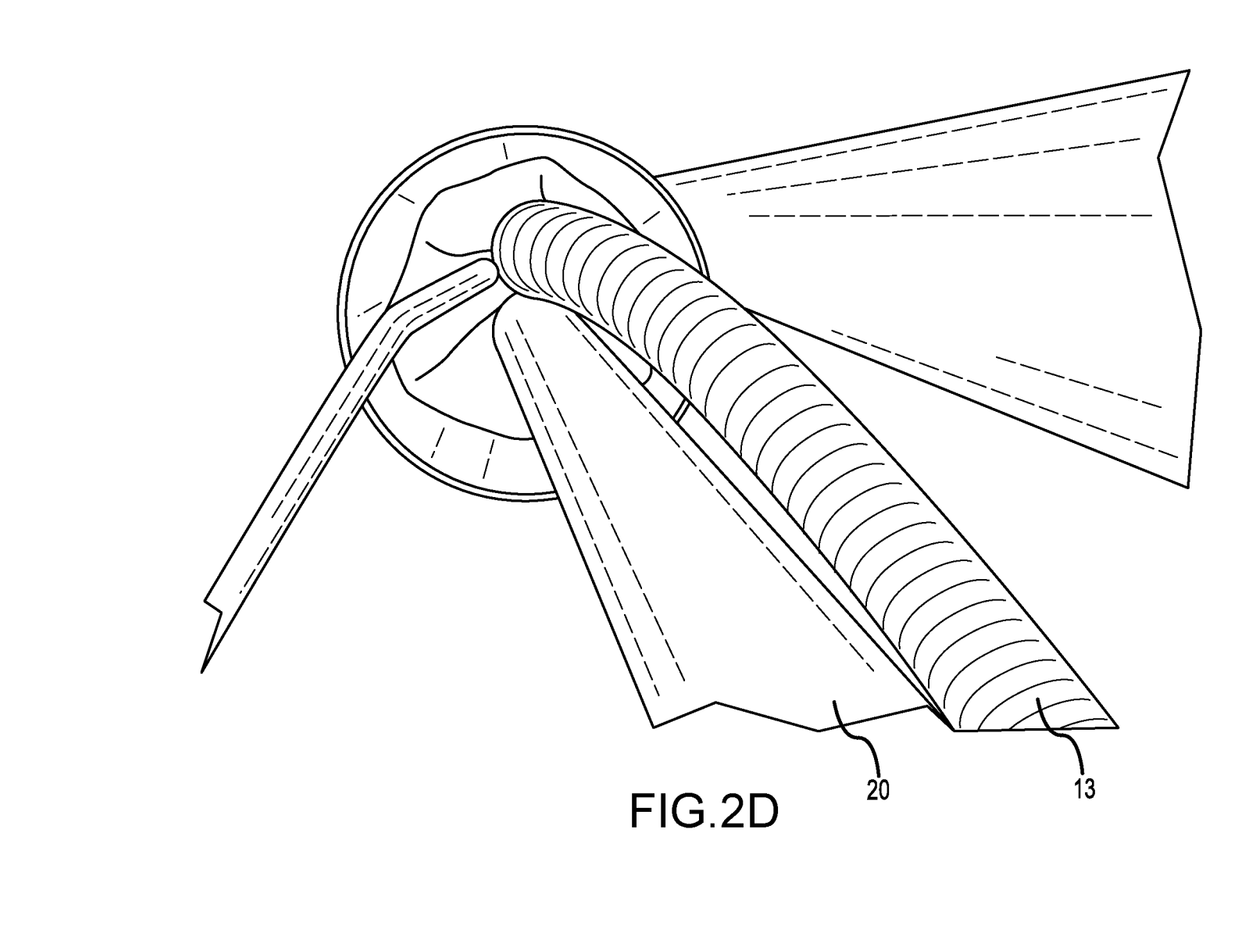
FIG. 2D is a view illustrating one example of a part of the configuration of the inspection apparatus according to the embodiment of the present invention.

The air vent portion 15 includes the air vent tube 151 and the valve 152. The air vent portion 15 is provided at the other end of the conduit 10 on the downstream side, and air that has flowed into the interior of the conduit 10 is released by the air vent portion 15 from the interior of the conduit 10 to the outside of the conduit 10.

One end of the air vent tube 151 is connected to the other end of the conduit 10 on the downstream side, and the other end of the air vent tube 151 is opened toward the outside. When the operator confirms that water that does not contain air is drained from the air vent tube 151, the operator can determine that the interior of the conduit 10 is filled with water. Further, when the operator confirms that water containing air is drained from the air vent tube 151, the operator can determine that air and water are mixed in the interior of the conduit 10. That is, the operator can determine whether or not the interior of the conduit 10 is filled with water by checking whether water that does not contain air is drained from the air vent tube 151 or water containing air is drained from the air vent tube 151.

The valve 152 is provided in the middle of the air vent tube 151 to control opening or blocking of the other end of the conduit 10 on the downstream side. When the valve 152 opens, the other end of the conduit 10 is opened, and when the valve 152 closes, the other end of the conduit 10 is blocked. When the water supply portion continues to supply water to the interior of the conduit 10, and the valve 152 closes after water that does not contain air is drained from the air vent tube 151, both ends of the conduit 10 are blocked and the interior of the conduit 10 is filled with water.

In addition, the valve 152 controls releasing air from the interior of the conduit 10 to the outside of the conduit 10. When the water supply portion starts supplying water to the interior of the conduit 10 with the valve 152 being opened, air mixed with water in the interior of the conduit 10 is pressed out toward the other end of the conduit 10 and is released to the outside of the conduit 10. On the other hand, when the water supply portion starts supplying water to the interior of the conduit 10 with the valve 152 being closed, air remains in the interior of the conduit 10 without being released to the outside of the conduit 10.

The pressure measurement apparatus 14 includes the pressure gauge 141, the water supply valve 142, and the drain valve 143. The pressure measurement apparatus 14 is connected to the hose 13 and is provided between the conduit 10 and the pump 12.

The pressure gauge 141 measures a pressure value of the interior of the conduit 10. By checking the scale indicated by the pressure gauge 141, the operator can grasp the pressure value of the interior of the conduit 10. The water supply valve 142 controls supplying water to the interior of the conduit 10 or stopping the water supply. When the water supply valve 142 opens and the pump 12 is driven, supplying water from the tank 11 to the interior of the conduit 10 starts through the hose 13. When the water supply valve 142 closes, the water supply to the interior of the conduit 10 stops. The drain valve 143 controls draining water from the interior of the conduit 10 or stopping the water drainage. When the drain valve 143 opens, draining from the interior of the conduit 10 starts, and when the drain valve 143 closes, the water drainage from the interior of the conduit 10 stops.

The pressurizing portion is configured of, for example, the tank 11, the pump 12, the hose 13, the pressure gauge 141, the water supply valve 142, and the air vent portion 15. When the water supply portion continues to supply water to the interior of the conduit 10, water that does not contain air is drained from the air vent tube 151. When all of the air is released from the interior of the conduit 10 to the outside of the conduit 10, the pressurizing portion closes the water supply valve 142 and stops the pump 12. Furthermore, the pressurizing portion closes the valve 152 of the air vent portion 15 and blocks the other end of the conduit 10 on the downstream side. As a result, both ends of the conduit 10 are blocked and the interior of the conduit 10 is filled with water. In this state, the pressurizing portion opens the water supply valve 142 and drives the pump 12 to supply water from the tank 11 to the interior of the conduit 10 through the hose 13. When the pressurizing portion continues to supply water to the interior of the conduit 10, the pressure of the interior of the conduit 10 gradually increases.

The pressurizing portion continues to supply water to the interior of the conduit 10 until the pressure value of the interior of the conduit 10 measured by the pressure gauge 141 reaches a predetermined pressure value (for example, 49 kPa). When the pressure value of the interior of the conduit 10 measured by the pressure gauge 141 reaches the predetermined pressure value, the pressurizing portion stops the water supply to the interior of the conduit 10. On the other hand, when the pressure value of the interior of the conduit 10 measured by the pressure gauge 141 does not reach the predetermined pressure value, the pressurizing portion continues to supply water to the interior of the conduit 10. The predetermined pressure value is a given set value, but in consideration of the fact that a common communication conduit is resistant to pressure of up to 98 kPa, it is preferable that the predetermined pressure value be approximately 49 kPa.

By checking the scale indicated by the pressure gauge 141, the operator can determine whether or not the pressure value of the interior of the conduit 10 reaches the predetermined pressure value. When the scale indicated by the pressure gauge 141 is, for example, equal to or larger than 49 kPa, the operator can determine that the pressure value of the interior of the conduit 10 reaches 49 kPa. When the scale indicated by the pressure gauge 141 is, for example, smaller than 49 kPa, the operator can determine that the pressure value of the interior of the conduit 10 does not reach 49 kPa. Note that in the case where the pressure value of the interior of the conduit 10 does not reach the predetermined pressure value even after the pressurizing portion continues to supply water to the interior of the conduit 10 for a long period of time, the pressurizing portion stops the water supply to the interior of the conduit 10. In this case, the operator can determine that the conduit 10 has an abnormality by checking the scale indicated by the pressure gauge 141.

The pressure gauge 141 measures the pressure value of the interior of the conduit 10 when the pressurization ends (for example, when the pressure value of the interior of the conduit 10 reaches 49 kPa). In addition, the pressure gauge 141 measures the pressure value of the interior of the conduit 10 when a predetermined period of time elapses (for example, when three minutes elapses after the pressure value of the interior of the conduit 10 reaches 49 kPa).

The operator compares the pressure value of the interior of the conduit 10 when the pressurization ends with the pressure value of the interior of the conduit 10 when the predetermined period of time elapses, and determines whether or not the pressure value of the interior of the conduit 10 when the predetermined period of time elapses drops from the pressure value of the interior of the conduit 10 when the pressurization ends.

In a case where the pressure value of the interior of the conduit 10 when the predetermined period of time elapses is smaller than the pressure value of the interior of the conduit 10 when the pressurization ends, the operator determines that the conduit 10 has an abnormality. In other words, in the case where the pressure value of the interior of the conduit 10 when the predetermined period of time elapses drops from the pressure value of the interior of the conduit 10 when the pressurization ends, the operator determines that the conduit 10 has an abnormality.

In a case where the pressure value of the interior of the conduit 10 when the predetermined period of time elapses is equal to the pressure value of the interior of the conduit 10 when the pressurization ends, the operator determines that the conduit 10 has no abnormality. In other words, in the case where the pressure value of the interior of the conduit 10 when the predetermined period of time elapses does not drop from the pressure value of the interior of the conduit 10 when the pressurization ends, the operator determines that the conduit 10 has no abnormality. Note that the pressure value of the interior of the conduit 10 when the predetermined period of time elapses does not need to be completely equal to the pressure value of the interior of the conduit 10 when the pressurization ends, and there may be an error therebetween within an acceptable range in the technical field of the present invention. For example, in a case where the conduit 10 is a common communication conduit, when the error is within a range less than ±1.96 kPa, the pressure value of the interior of the conduit 10 when the predetermined period of time elapses is considered to be equal to the pressure value of the interior of the conduit 10 when the pressurization ends.

The inspection apparatus 100 according to the present embodiment includes the water supply portion, the air vent portion 15, the pressurizing portion, and the pressure measurement portion 141. The water supply portion supplies water from the tank 11 to the interior of the conduit 10 through the hose 13 provided at the one end of the conduit 10. The air vent portion 15 releases air from the interior of the conduit 10 to the outside of the conduit 10 through the air vent tube 151 provided at the other end of the conduit 10. The pressurizing portion increases the pressure of the interior of the conduit 10 whose both ends are blocked and whose interior is filled with water. The pressure measurement portion 141 measures the pressure value of the interior of the conduit 10 when the pressurization ends and the pressure value of the interior of the conduit 10 when the predetermined period of time elapses. The inspection apparatus 100 enables the operator to reliably find an abnormality in the conduit that cannot be checked from the captured video by the pipe camera. In addition, the operators can determine whether or not the conduit 10 has an abnormality based on the quantitative indicator of whether or not the pressure value of the interior of the conduit 10 when the predetermined period of time elapses drops from the pressure value of the interior of the conduit 10 when the pressurization ends, which thus can resolve a known problem in the art that the inspection accuracy varies for each of operators. In addition, no space is required to insert the pipe camera, and thus even when a thick cable or a plurality of cables bundled together are accommodated in the conduit 10, it is possible to inspect the conduit 10 with high accuracy regardless of the diameter of the conduit 10.

Therefore, the inspection apparatus 100 according to the present embodiment can be used to inspect the conduit 10 with high accuracy without requiring a large space inside the conduit 10.

Inspection Method

Figure 3:
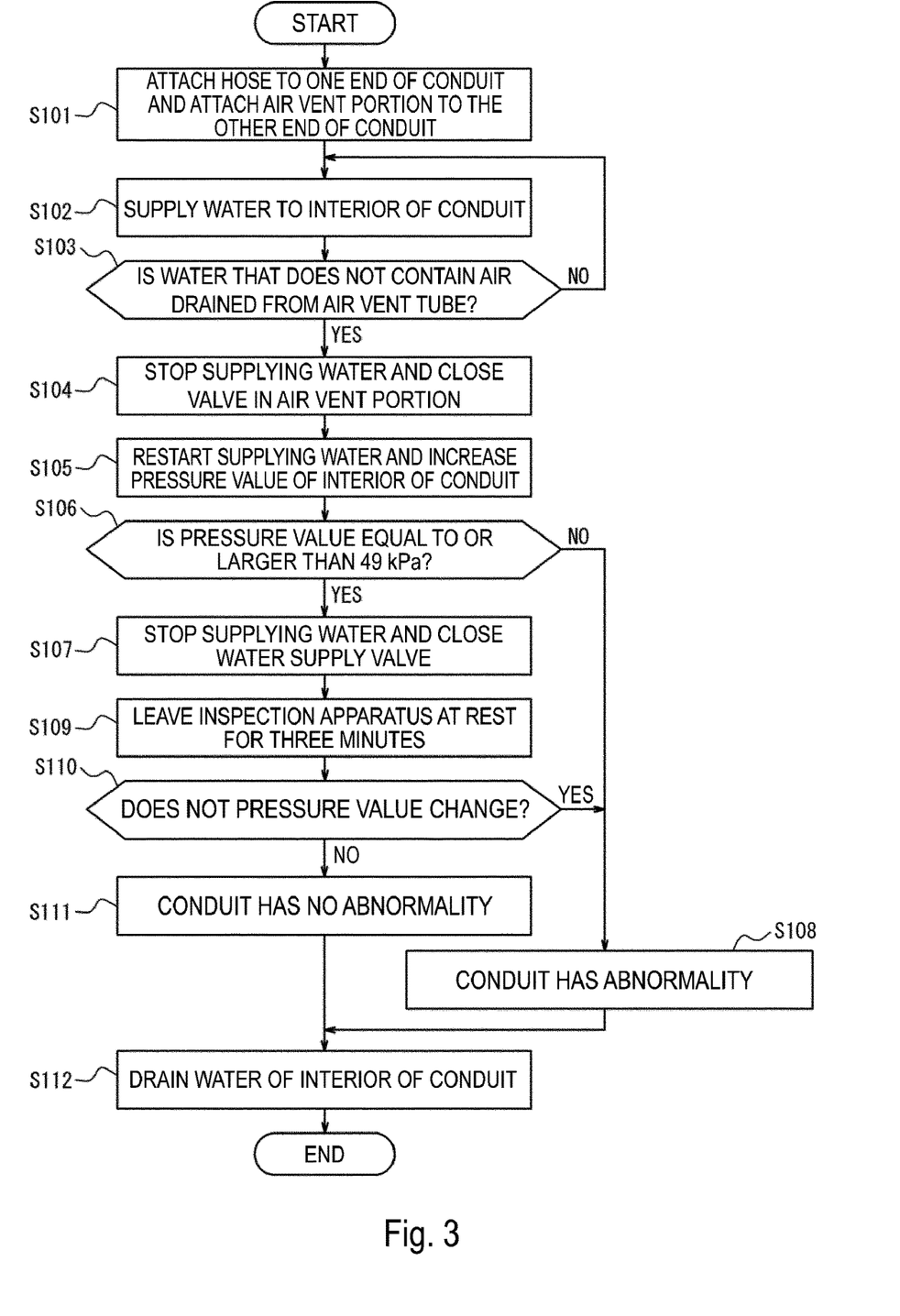
FIG. 3 is a flowchart illustrating one example of an inspection method according to the embodiment of the present invention.

Next, an inspection method according to the embodiment of the present invention will be described with reference to the flowchart illustrated in FIG. 3.

In step S101, the operator attaches the hose 13 to one end of the conduit 10 on the upstream side, and attaches the air vent portion 15 to the other end of the conduit 10 on the downstream side.

In step S102, the water supply portion opens the water supply valve 142 and drives the pump 12 to supply water from the tank 11 to the interior of the conduit 10 through the hose 13.

In step S103, air that has flowed into the interior of the conduit 10 is released by the air vent portion 15 from the interior of the conduit 10 to the outside of the conduit 10 through the air vent tube 151. Then, the operator determines whether or not water containing air is drained from the air vent tube 151. When the operator determines that water that does not contain air is drained from the air vent tube 151 (step S103→YES), processing of step S104 is performed. When the operator determines that water containing air is drained from the air vent tube 151 (step S103→NO), the processing of step S102 is performed.

In step S104, the pressurizing portion closes the water supply valve 142 and stops the pump 12. Furthermore, the pressurizing portion closes the valve 152 of the air vent portion 15 and blocks the other end of the conduit 10 on the downstream side. As a result, both ends of the conduit 10 are blocked and the interior of the conduit 10 is filled with water.

In step S105, the pressurizing portion opens the water supply valve 142 and drives the pump 12 to supply water from the tank 11 to the interior of the conduit 10 through the hose 13. The pressurizing portion continues to supply water to the interior of the conduit 10 to increase the pressure of the interior of the conduit 10 until the pressure value of the interior of the conduit 10 measured by the pressure gauge 141 reaches a predetermined pressure value (for example, 49 kPa).

In step S106, the operator determines whether or not the pressure value of the interior of the conduit 10 reaches the predetermined pressure value by checking the scale indicated by the pressure gauge 141. When the operator determines that the pressure value of the interior of the conduit 10 reaches the predetermined pressure value (for example, the pressure value of the interior of the conduit 10≥49 kPa) (step S106→YES), processing of step S107 is performed. When the operator determines that the pressure value of the interior of the conduit 10 does not reach the predetermined pressure value (for example, the pressure value of the interior of the conduit 10<49 kPa) (step S106→NO), processing of step S108 is performed.

In step S107, the pressurizing portion closes the water supply valve 142, stops the pump 12, and stops supplying water to the interior of the conduit 10.

In step S108, the operator determines that the conduit 10 has an abnormality.

In step S109, the operator leaves the inspection apparatus 100 at rest for a predetermined period of time (for example, for three minutes).

In step S110, the operator checks the scale indicated by the pressure gauge 141. Then, the operator compares the pressure value of the interior of the conduit 10 when the pressurization ends with the pressure value of the interior of the conduit 10 when the predetermined period of time elapses, and determines whether or not the pressure value of the interior of the conduit 10 when the predetermined period of time elapses drops from the pressure value of the interior of the conduit 10 when the pressurization ends. In a case where the operator determines that the pressure value of the interior of the conduit 10 when the predetermined period of time elapses is equal to the pressure value of the interior of the conduit 10 when the pressurization ends, that is, in a case where the operator determines that the pressure value of the interior of the conduit 10 when the predetermined period of time elapses does not drop from the pressure value of the interior of the conduit 10 when the pressurization ends (step S110→NO), processing of step S111 is performed. In a case where the operator determines that the pressure value of the interior of the conduit 10 when the predetermined period of time elapses is smaller than the pressure value of the interior of the conduit 10 when the pressurization ends, that is, in a case where the operator determines that the pressure value of the interior of the conduit 10 when the predetermined period of time elapses drops from the pressure value of the interior of the conduit 10 when the pressurization ends (step S110→YES), the processing of step S108 is performed.

In step S111, the operator determines that the conduit 10 has no abnormality.

In step S112, the operator opens the drain valve 63 and drains the water in the interior of the conduit 10.

The inspection method described above can be used to inspect the conduit 10 with high accuracy without requiring a large space inside the conduit 10.

Experiment for Checking Water-Tightness

Figure 4:
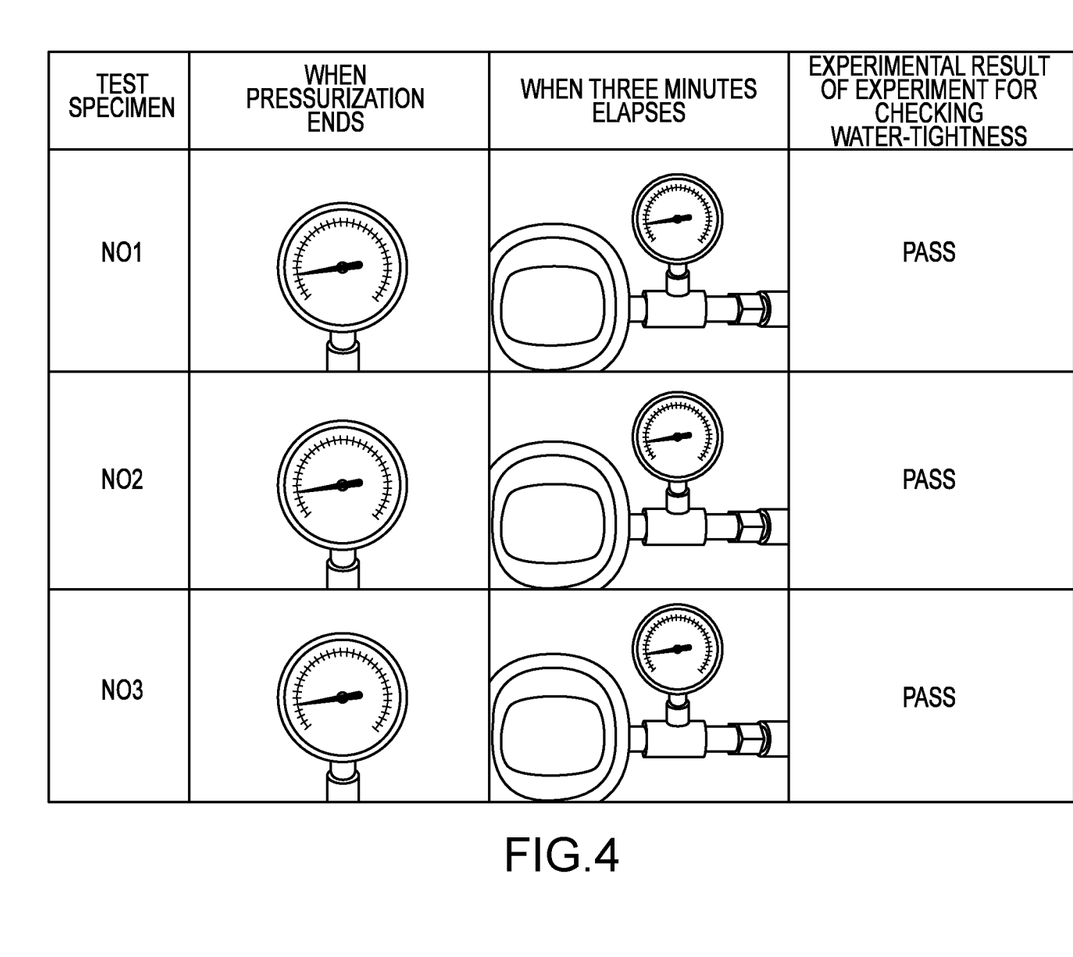
FIG. 4 is a table showing one example of experimental results of an experiment for checking water-tightness.
Figure 5A:
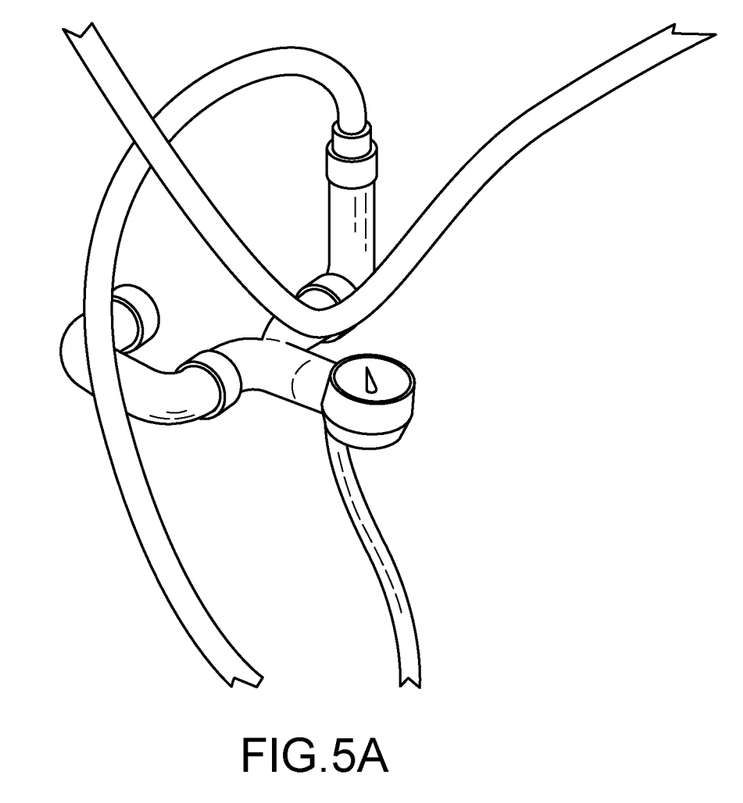
FIG. 5A is a view illustrating a pressure gauge in a case where water leaked.
Figure 5B:
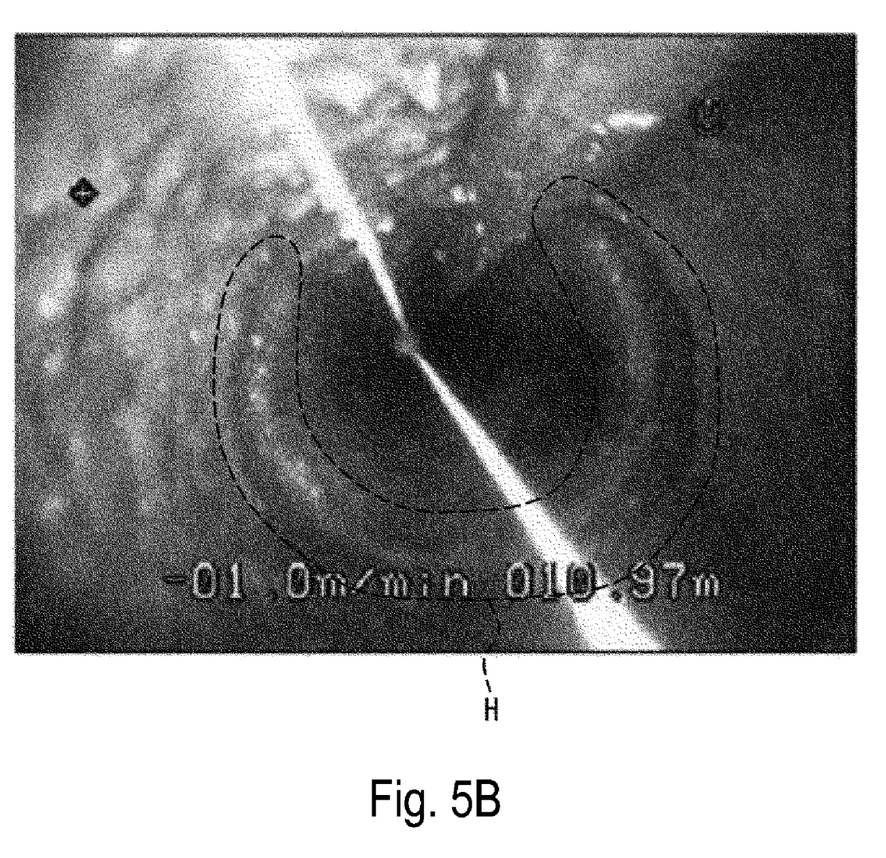
FIG. 5B is a view illustrating a state of an interior of a conduit in the case where water leaked.

An operator applied the inspection method according to the present embodiment to a plurality of conduits to perform an experiment for checking water-tightness. FIG. 4 is a table showing one example of experimental results of the experiment for checking the water-tightness. FIG. 5 is views illustrating a state of the interior of the conduit in a case where water leaked.

Experimental Conditions

Test specimens: four conduits
Test specimen No. 1
Test specimen No. 2
Test specimen No. 3
Test specimen No. 4
Pressure: 49 kPa (pressure resistance capability of each conduit: MAX 98 kPa)
Period of time left at rest: three minutes Test Specimens No. 1 to No. 3

As illustrated in FIG. 4, the operator checked the scale indicated by the pressure gauge 141, and confirmed that the pressure value of the interior of each of the test specimens No. 1 to No. 3 when the pressurization ended was 49 kPa. Additionally, as illustrated in FIG. 4, the operator checked the scale indicated by the pressure gauge 141, and confirmed that the pressure value of the interior of each of the test specimens No. 1 to No. 3 when three minutes elapsed after the end of the pressurization was 49 kPa. That is, the operator confirmed that there was no drop in the pressure value of the interior of each of the test specimens No. 1 to No. 3 during the lapse of three minutes after the end of the pressurization.

When the operator determined that the test specimens No. 1 to No. 3 had no abnormality, and checked whether or not water leaked, the operator confirmed that water did not leak in the test specimens No. 1 to No. 3 ("Pass").

Therefore, it was verified that there was no abnormality in the conduit performance for the conduits that maintained the pressure value during the lapse of three minutes after the end of the pressurization.

Test Specimen No. 4

The operator checked the scale indicated by the pressure gauge 141 and confirmed that the pressure value of the interior of the test specimen No. 4 when the pressurization ended was 49 kPa. Additionally, as illustrated in FIG. 5A, the operator checked the scale indicated by the pressure gauge 141, and confirmed that the pressure value of the interior of the test specimen No. 4 rapidly dropped to 0 kPa and the pressure value was not able to be maintained during the lapse of three minutes after the end of the pressurization. That is, the operator confirmed that the pressure value of the interior of the test specimen No. 4 rapidly dropped during the lapse of three minutes after the end of the pressurization.

When the operator determined that the test specimen No. 4 had an abnormality, and checked whether or not water leaked, the operator confirmed that the water leaked in the test specimen No. 4.

Thus, after opening the drain valve 63 and draining the water in the interior of the conduit 10, the operator inserted a pipe camera to the interior of the test specimen No. 4, and captured a video of the interior of the test specimen No. 4. As illustrated in FIG. 5B, the operator confirmed the shearing of the tube (a damaged portion H) in the interior of the test specimen No. 4.

Therefore, it was verified that there was an abnormality in the conduit performance for the conduit that did not maintained the pressure value during the lapse of three minutes after the end of the pressurization.

As described above, from the experimental results of the experiment for checking water-tightness by using the test specimens No. 1 to No. 4, it was verified that there was no abnormality in the conduit in which the pressure value dropped during the lapse of three minutes after the end of the pressurization, and that there was an abnormality in the conduit in which the pressure value did not drop during the lapse of three minutes after the end of the pressurization. That is, it was verified that the conduits were able to be inspected with high accuracy by the inspection method according to the present embodiment.

The above embodiment has been described as a representative example, but it is apparent to those skilled in the art that many changes and substitutions are possible within the spirit and scope of the present invention. Therefore, the present invention should not be construed as being limited by the embodiment described above, and various modifications and changes can be made without departing from the scope of the claims. For example, the order of the processes described in the flowchart of the embodiment is not limited to the above and can be changed as appropriate. Additionally, a plurality of processes may be combined into one process, or one process may be divided.

REFERENCE SIGNS LIST

10 Conduit
11 Tank
12 Pump
13 Hose
14 Pressure measurement apparatus
15 Air vent portion
20 Cable
100 Inspection apparatus
141 Pressure gauge (pressure measurement portion)
142 Water supply valve
143 Drain valve
151 Air vent tube
152 Valve

The invention claimed is:

1. A method for inspecting an interior of a conduit and for determining abnormality associated with the conduit, comprising:
   supplying water from a tank to an interior of the conduit through a hose connected to the conduit at a first end of the conduit;
   while the supplying of the water continues:
      releasing air at a second end of the conduit from the interior of the conduit to an outside of the conduit through an air vent tube of an air vent portion placed at the second end of the conduit, wherein the second end is distinct from the first end, wherein the releasing of air continues until water is released through the air vent tube;
      determining whether water that does not contain air is drained from the air vent tube placed at the second end of the conduit; and
      when it is determined in the determining that water that does not contain air is drained from the air vent tube, stopping the supplying of the water to the interior of the conduit, closing an air vent valve of the air vent portion, and, when the air vent valve is closed, the closed air vent valve of the air vent portion prevents the air from being released to outside the conduit;
   resume supplying the water into the interior of the conduit at the first end of the conduit while both the first and second ends of the conduit are blocked, thereby increasing a pressure of the interior of the conduit whose interior is filled with water; and
   when the pressure of the interior of the conduit reaches a predetermined pressure value, stopping the resumed supplying of the water;
   measuring a pressure value of the interior of the conduit when a predetermined period of time elapses since stopping the resumed supplying of the water, wherein the predetermined period of time elapses while the conduit is blocked at the first end and the second end and without receiving further supply of the water; and
   determine, based on a change in the measured pressure value of the interior of the conduit, the abnormality associated with the conduit.

2. The method according to claim 1, further comprising:
   determining that the conduit has the abnormality when the pressure value of the interior of the conduit when the predetermined period of time elapses drops from the pressure value of the interior of the conduit when the pressurization ends, and that the conduit has no abnormality when the pressure value of the interior of the conduit when the predetermined period of time elapses does not drop from the pressure value of the interior of the conduit when the pressurization ends.

3. The method according to claim 1,
   wherein the performing of the pressurization includes:
      determining whether or not the pressure value of the interior of the conduit reaches the predetermined pressure value, and
      supplying the water to the interior of the conduit when the pressure value of the interior of the conduit does not reach the predetermined pressure value.

4. The method according to claim 2,
   wherein the performing of the pressurization includes:
      determining whether or not the pressure value of the interior of the conduit reaches the predetermined pressure value, and supplying the water to the interior of the conduit when the pressure value of the interior of the conduit does not reach the predetermined pressure value.

5. An inspection apparatus for inspecting an interior of a conduit and for determining abnormality associated with the conduit, comprising:
   a water supplier configured to supply water from a tank to an interior of the conduit through a hose provided at a first end of the conduit;
   an air releaser configured to release air at a second end of the conduit from the interior of the conduit to an outside of the conduit through an air vent tube of an air vent portion placed at the second end of the conduit until an air vent valve closes, wherein the second end is distinct from the first end, the air vent portion includes an air vent valve, and when the air vent valve of the air vent portion is closed the closed air vent valve prevents the air from being released to outside the conduit;
   a pressurizer configured to increase a pressure of the interior of the conduit whose both ends are blocked at the first end and the second end by supplying the water and whose interior is filled with water; and
   a pressure measurer configured to measure a pressure value of the interior of the conduit when pressurization ends and a pressure value of the interior of the conduit when a predetermined period of time elapses since stopping the resumed supplying of the water to detecting the abnormality of the conduit,
   wherein the water supplier supplies water to the interior of the conduit until water that does not contain air is drained from the air vent tube,
   wherein the predetermined period of time elapses while the conduit is blocked at the first end and the second end and without receiving further supply of the water, and
   wherein the abnormality of the conduit is associated with a change of the pressure value of the interior of the conduit when the predetermined time lapses.

6. The inspection apparatus according to claim 5, further comprising:
   an abnormality determiner configured to, when the pressure value of the interior of the conduit when the predetermined period of time elapses drops from the pressure value of the interior of the conduit when the pressurization ends, determine that the conduit has the abnormality.

7. The inspection apparatus according to claim 5, further comprising:
   an abnormality determiner configured to, when the pressure value of the interior of the conduit when the predetermined period of time elapses does not drop from the pressure value of the interior of the conduit when the pressurization ends, determine that the conduit has no abnormality.

8. The inspection apparatus according to claim 5, wherein the pressurizer determines whether or not the pressure value of the interior of the conduit reaches a predetermined pressure value, and supplies water to the interior of the conduit when the pressure value of the interior of the conduit does not reach the predetermined pressure value.

9. The inspection apparatus according to claim 6, wherein the pressurizer determines whether or not the pressure value of the interior of the conduit reaches a predetermined pressure value, and wherein the pressurizer supplies water to the interior of the conduit when the pressure value of the interior of the conduit does not reach the predetermined pressure value.

10. The inspection apparatus according to claim 7, wherein the pressurizer determines whether or not the pressure value of the interior of the conduit reaches a predetermined pressure value, and wherein the pressurizer supplies water to the interior of the conduit when the pressure value of the interior of the conduit does not reach the predetermined pressure value.

11. A method for inspecting an interior of a conduit and for determining abnormality associated with the conduit, the method comprising:
   supplying, by a water supplier, water from a tank to the interior of the conduit through a hose connected to the conduit at a first end of the conduit;
   releasing, by an air releaser, air from the interior of the conduit to an outside of the conduit at a second end of the conduit through an air vent tube of an air vent portion placed at the second end of the conduit until an air vent valve closes, wherein the second end is distinct from the first end, and, when an air vent valve is closed, the closed air vent valve prevents the air from being released to outside the conduit;
   pressurizing, by a pressurizer, the interior of the conduit, wherein the conduit is blocked at the first end and the second end, and whose interior is filled with water; and
   determining, by a pressure determiner, a pressure value of the interior of the conduit when pressurization ends and a pressure value of the interior of the conduit when a predetermined period of time elapses since stopping the resumed supplying of the water to detect the abnormality of the conduit,
   wherein the water supplier supplies water to the interior of the conduit until water that does not contain air is drained from the air vent tube,
   wherein the predetermined period of time elapses while the conduit is blocked at the first end and the second end and without receiving further supply of the water, and
   wherein the abnormality of the conduit is associated with a change of the pressure value of the interior of the conduit when the predetermined time lapses.

12. The method according to claim 11, further comprising:
   when the pressure value of the interior of the conduit when the predetermined period of time elapses drops from the pressure value of the interior of the conduit when the pressurization ends, determining, by an abnormality determiner, that the conduit has the abnormality.

13. The method according to claim 11,
   when the pressure value of the interior of the conduit when the predetermined period of time elapses does not drop from the pressure value of the interior of the conduit when the pressurization ends, determining, by an abnormality determiner, that the conduit has no abnormality.

14. The method according to claim 11,
   wherein the pressurizer determines whether or not the pressure value of the interior of the conduit reaches a predetermined pressure value, and supplies water to the interior of the conduit when the pressure value of the interior of the conduit does not reach the predetermined pressure value.

15. The method according to claim 12,
   wherein the pressurizer determines whether or not the pressure value of the interior of the conduit reaches a predetermined pressure value, and wherein the pressurizer supplies water to the interior of the conduit when the pressure value of the interior of the conduit does not reach the predetermined pressure value.

16. The method according to claim 13,
wherein the pressurizer determines whether or not the pressure value of the interior of the conduit reaches a predetermined pressure value, and wherein the pressurizer supplies water to the interior of the conduit when the pressure value of the interior of the conduit does not reach the predetermined pressure value.

* * * * *